United States Patent
Seguchi et al.

(10) Patent No.: US 9,130,431 B2
(45) Date of Patent: Sep. 8, 2015

(54) STATOR FOR ROTARY ELECTRICAL MACHINE

(75) Inventors: Masahiro Seguchi, Obu (JP); Yuuichirou Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 13/324,062

(22) Filed: Dec. 13, 2011

(65) Prior Publication Data

US 2012/0146447 A1  Jun. 14, 2012

(30) Foreign Application Priority Data

Dec. 13, 2010 (JP) .................................. 2010-276671

(51) Int. Cl.
| | |
|---|---|
| H02K 3/04 | (2006.01) |
| H02K 3/50 | (2006.01) |
| H02K 3/12 | (2006.01) |
| H02K 3/28 | (2006.01) |

(52) U.S. Cl.
CPC .. *H02K 3/50* (2013.01); *H02K 3/04* (2013.01); *H02K 3/12* (2013.01); *H02K 3/28* (2013.01)

(58) Field of Classification Search
CPC .................................. H02K 3/04; H02K 3/12
USPC ........................... 310/195, 198, 201, 179, 180
See application file for complete search history.

(56) References Cited

U.S. PATENT DOCUMENTS

| | | | | |
|---|---|---|---|---|
| 6,759,780 | B2 * | 7/2004 | Liu et al. ....................... | 310/184 |
| 6,825,589 | B2 * | 11/2004 | Kouda et al. .................. | 310/207 |
| 6,894,417 | B2 * | 5/2005 | Cai et al. ....................... | 310/198 |
| 6,995,492 | B1 * | 2/2006 | Kouda et al. .................. | 310/254.1 |
| 7,170,211 | B2 * | 1/2007 | Chen et al. .................... | 310/207 |
| 2001/0040416 | A1 | 11/2001 | Nakamura et al. | |
| 2002/0050395 | A1 | 5/2002 | Kusumoto et al. | |
| 2005/0212372 | A1 | 9/2005 | Akita et al. | |
| 2008/0012444 | A1 * | 1/2008 | Hattori .......................... | 310/198 |
| 2009/0200888 | A1 * | 8/2009 | Tanaka et al. ................. | 310/195 |

FOREIGN PATENT DOCUMENTS

| | | |
|---|---|---|
| JP | P2001-169490 A | 6/2001 |
| JP | P2002-027693 A | 1/2002 |
| JP | P2003-125550 A | 4/2003 |
| JP | P2004-048941 A | 2/2004 |
| JP | P2005-287109 A | 10/2005 |
| JP | P4186317 | 9/2008 |
| JP | P2008-245489 A | 10/2008 |

OTHER PUBLICATIONS

Office Action (1 page) dated Dec. 13, 2012 issued in corresponding Japanese Application No. 2010-276671 and English translation (1 page).

* cited by examiner

*Primary Examiner* — Thomas Truong
(74) *Attorney, Agent, or Firm* — Nixon & Vanderhye P.C.

(57) ABSTRACT

A stator includes a ring-shaped stator core and a stator winding. The stator core has a plurality of slots arranged in a circumferential direction. The stator winding has a plurality of phase windings. Each phase winding is composed of a plurality of segment conductors 41 disposed such as to be inserted into the slots and connected in series. The segment conductor is divided into two. The phase winding is configured by two divided phase windings connected to each other in parallel. The divided phase windings are respectively configured by a plurality of segment conductors respectively connected in series such that the two divided segment conductors are in parallel with each other.

4 Claims, 17 Drawing Sheets

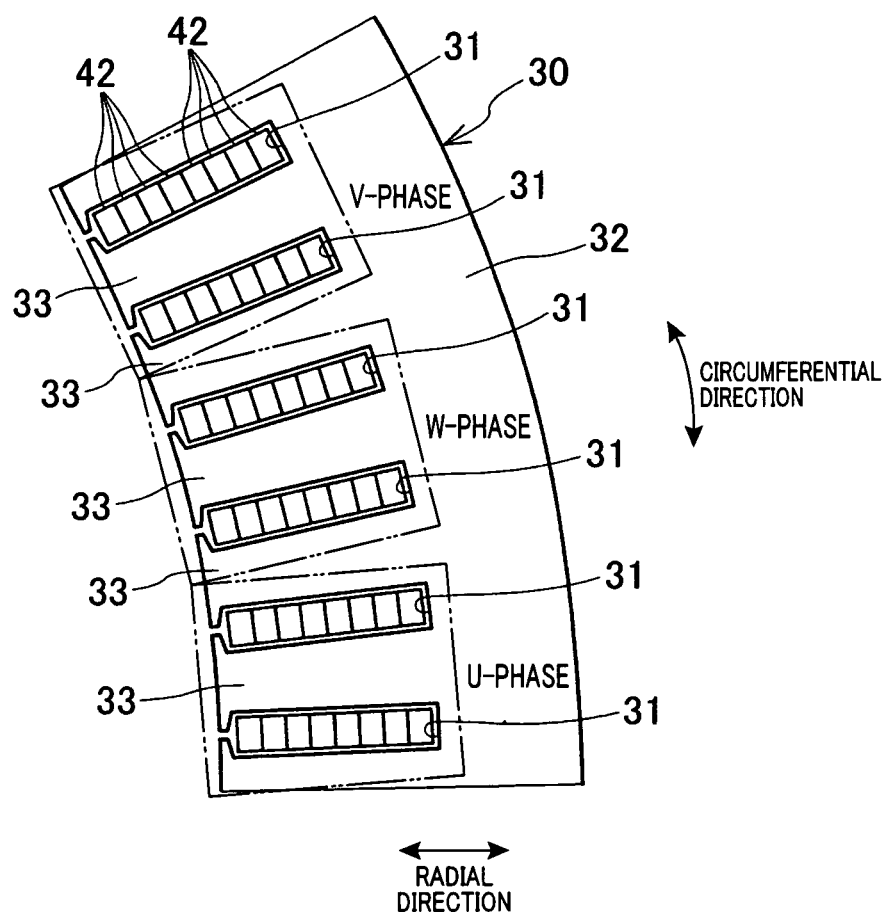

WELDING POINT

VOLTAGE PHASE IS 60 elec.deg
(WHEN SLOT PITCH IS TWO SLOTS PER PHASE)

EXAMPLE 2
(FOUR DIVIDED PHASE WINDINGS CONNECTED IN PARALLEL)

WINDING SPACE FACTOR: 56%
PHASE RESISTANCE: 28.9 mΩ

EXAMPLE 1
(TWO DIVIDED PHASE WINDINGS CONNECTED IN PARALLEL)

WINDING SPACE FACTOR: 64%
PHASE RESISTANCE: 25.4 mΩ

COMPARISON EXAMPLE 1
(SERIAL CONNECTION)

WINDING SPACE FACTOR: 68%
PHASE RESISTANCE: 24 mΩ

STATOR FOR ROTARY ELECTRICAL MACHINE

CROSS-REFERENCE TO RELATED APPLICATION

This application is based on and claims the benefit of priority from earlier Japanese Patent Application No. 2010-276671 filed Dec. 13, 2010, the description of which is incorporated herein by reference.

BACKGROUND OF THE INVENTION

1. Field of the Invention

The present invention relates to a stator for a rotary electrical machine that is, for example, mounted in a vehicle.

2. Description of the Related Art

As a stator for a rotary electrical machine, for example, as disclosed in U.S. Pat. No. 4,186,317, a stator is known that includes a ring-shaped stator core and a stator winding. The stator core has a plurality of slots arranged in a circumferential direction. The stator winding has a plurality of phase windings composed of a plurality of segment conductors that are disposed such as to be inserted into the slots and connected in series.

As shown in a connection diagram in FIG. 23B, each phase winding 143 configuring the stator winding is composed of a plurality of segment conductors 141 that are connected in series. As shown in FIG. 23A, the plurality of segment conductors 141 configuring a phase winding 143 of a single phase are disposed such as to be inserted into each slot 131 of the stator core 130. The plurality of segment conductors 141 are aligned in a radial direction. In this instance, the number of turns per slot is four.

JP-A-2002-27693 discloses a winding conductor for a rotary electrical machine. The winding conductor is inserted into the slots of a rotary electrical machine core. The winding conductor is composed of a plurality of wires that are compression-bonded to one another and press-molded to form a bundle that has a substantially rectangular cross-section.

In the rotary electrical machine disclosed in U.S. Pat. No. 4,186,317, as shown in FIG. 24, eddy current is generated within the segment conductors 141 as a result of leakage flux within the slot 131 interlinking with the segment conductors 141 configuring each phase winding 143 during energization of the stator. In particular, when the rotary electrical machine is being operated in a high-speed, high-torque load state, a large loss (alternating-current (AC) copper loss) occurs as a result of the eddy current. When the AC copper loss occurs in this way, problems occur in that the segment conductors 141 generate heat, a motor (rotary electrical machine) cannot be made smaller, and the like.

It is considered possible that the eddy current can be suppressed by the winding conductor disclosed in JP-A-2002-27693 being applied to the stator winding disclosed in U.S. Pat. No. 4,186,317. However, when the winding conductor disclosed in JP-A-2002-27693 is applied, problems occur in that the stator winding becomes significantly difficult to manufacture, cost significantly increases, and the like.

SUMMARY

Hence, in light of the above-described drawbacks, it is desired to provide a stator for a rotary electrical machine that is capable of reducing eddy current loss caused by leakage flux using a simple configuration, without significantly increasing cost.

An exemplary embodiment provides a stator for a rotary electrical machine including a ring-shaped stator core having a plurality of slots arranged in a circumferential direction of the stator core; and a stator winding having a plurality of phase windings, each phase winding composed of a plurality of segment conductors disposed to be inserted in the slots and connected in series with each other. The segment conductor is divided into N-number of segment conductors (N being a natural number of two or higher). The phase winding is configured by N-number of divided phase windings connected to each other in parallel, each of the divided phase windings being configured by a plurality of segment conductors connected in series such that the divided N-number of segment conductors are in parallel with each other.

In the disclosure according to the first aspect, the segment conductor is divided into N-number of segment conductors. The phase winding is configured by N-number of divided phase windings connected to each other in parallel. Each divided phase winding is configured by a plurality of segment conductors connected in series such that the divided N-number of segment conductors are in parallel. Therefore, eddy current caused by leakage flux within the slots can be reduced. In other words, in the present disclosure, the segment conductor is divided into N-number of segment conductors in relation to the interlinked leakage flux. Therefore, resistance of the path over which eddy current flows increases in an equivalent manner (the distance over which eddy current flows increases in relation to the interlinkage flux), thereby reducing eddy current. Therefore, AC copper loss caused by eddy current can be reduced with certainty. As a result, heat generation of the segment conductors can be suppressed, and a motor (rotary electrical machine) can be made smaller. The amount of leakage flux within the slots does not change from that of conventional technology, even when the present disclosure is applied. In addition, in the present disclosure, as a method of constructing the stator winding, a conventional method of constructing a stator winding that uses a segment conductor that is not divided can be used. Therefore, significant changes in the production line are not required, and significant increase in cost can be avoided.

In the present disclosure, the segment conductor is divided such as to be cut along the extending direction of the segment conductor to form the N-number of segment conductors of the same shape. In addition, in the present disclosure, eddy current caused by leakage flux within the slots can be further significantly reduced, the greater the value of N is. However, as the value of N increases, the number of segment conductors increase. The connection structure of the divided phase windings (stator winding) becomes complicated. Therefore, the value of N should be decided, taking into consideration balance between these points.

In an disclosure according to a second aspect, in a plurality of slots having different voltage phases among the slots in which the phase winding of a same phase is disposed, respective segment conductors of the N-number of divided phase windings are present in a mixed state such that a total induced voltage of the plurality of segment conductors generated in each slot is the same.

In the disclosure according to the second aspect, a difference in the total induced voltage of the plurality of segment conductors generated in each slot can be prevented from occurring between the slots having different voltage phases. As a result, in a phase winding configured by N-number of divided phase windings connected to each other in parallel, a short-circuit current (circulating current) can be prevented from flowing.

In the present disclosure, the respective segment conductors of the N-number of divided phase windings present in a mixed state in the slots are merely required to be disposed such that the total voltage of the plurality of segment conductors generated in each slot is the same. The number of respective segment conductors and the placement positions thereof can be arbitrarily set.

In a disclosure according to a third aspect, the segment conductor has an insulating film that provides electrical insulation on a surface thereof.

In the disclosure according to the third aspect, the segment conductors disposed in the slots are electrically insulated from each other by an insulating film provided on the surfaces thereof. As a result, eddy current caused by leakage flux within the slots can be reduced with further certainty.

In a disclosure according to a fourth aspect, the segment conductor is divided such that the segment conductors are stacked (i.e., mounted on one another) in a direction perpendicular to a direction of leakage flux generated in the slot.

In the disclosure according to the fourth aspect, the segment conductor is divided such that the segment conductors are stacked on one another in a direction perpendicular to a direction of leakage flux generated in the slot. As a result, eddy current caused by leakage flux can be reduced with further certainty.

In a disclosure according to a fifth aspect, the segment conductor is divided into two segment conductors. The phase winding is configured by two divided phase windings connected to each other in parallel. Each divided phase winding configured by a plurality of segment conductors being connected in series such that the two divided segment conductors are in parallel.

In the disclosure according to the fifth aspect, the segment conductor is divided into two segment conductors. The phase winding is configured by two divided phase windings connected to each other in parallel. As a result, balance can be favorably adjusted between the effect of reducing AC copper loss caused by eddy current, and prevention of complicated connection structures of the divided phase windings (stator winding) accompanying the increase in the number of divisions (the number of segment conductors) of the segment conductor. In addition, copper loss occurring when the rotary electrical machine is rotating at a high speed and copper loss occurring when the rotary electrical machine is rotating at a low speed can be reduced in a well-balanced manner.

BRIEF DESCRIPTION OF THE DRAWINGS

In the accompanying drawings:

FIG. 4 is a schematic diagram of a state in which phase windings of three phases configuring a stator winding according to the embodiment are disposed within slots;

FIG. 5A and FIG. 5B are diagrams of the stator winding according to the embodiment, in which FIG. 5A is an overall perspective view, and FIG. 5B is a partial perspective view in which a portion of FIG. 5A is enlarged;

FIG. 11A and FIG. 11B are winding specification diagrams showing a connection state of a U-phase phase winding, in which FIG. 11A is a winding specification diagram of a first divided phase winding and FIG. 11B is a winding specification diagram of a second divided phase winding;

FIG. 17A and FIG. 17B are explanatory diagrams of a second variation, in which FIG. 17A is a planar view of the stator core around which the stator winding is wound and FIG. 17B is a schematic diagram of the placement positions of respective segment conductors of the first and second divided phase windings disposed in the two slots A and B having different voltage phases;

FIG. 18A and FIG. 18B are explanatory diagrams of the second variation, in which FIG. 18A is an overall perspective view of a phase winding of a single phase amounting to a single turn in which two divided phase windings are connected in parallel and FIG. 18B is a partial perspective view in which a portion of FIG. 18A is enlarged;

FIG. 19A to FIG. 19C are explanatory diagrams of FEM (finite element method) analysis performed to confirm AC copper loss reduction effects, in which FIG. 19A shows a comparison example 2 in which phase windings are connected in series, FIG. 19B shows an example 1 in which a phase winding has two divided phase windings connected in parallel, and FIG. 19C shows an example 2 in which a phase winding has four divided phase windings connected in parallel;

FIG. 22 is a graph comparing the overall copper loss between the example 1 (two divided phase windings connected in parallel) and the example 2 (four divided phase windings connected in parallel) in reference numbers A, B, D, E, and F in the urban area range shown in FIG. 21, FIG. 23A and FIG. 23B are diagrams of a conventional stator winding, in which

DETAILED DESCRIPTION OF THE PREFERRED EMBODIMENTS

Referring to the accompanying drawings, the stator of an electrical machine according to an embodiment and various variations thereof will now be described.

An embodiment in which a stator of a rotary electrical machine of the present invention is specified will hereinafter be described in detail with reference to the drawings.

Figure 1:
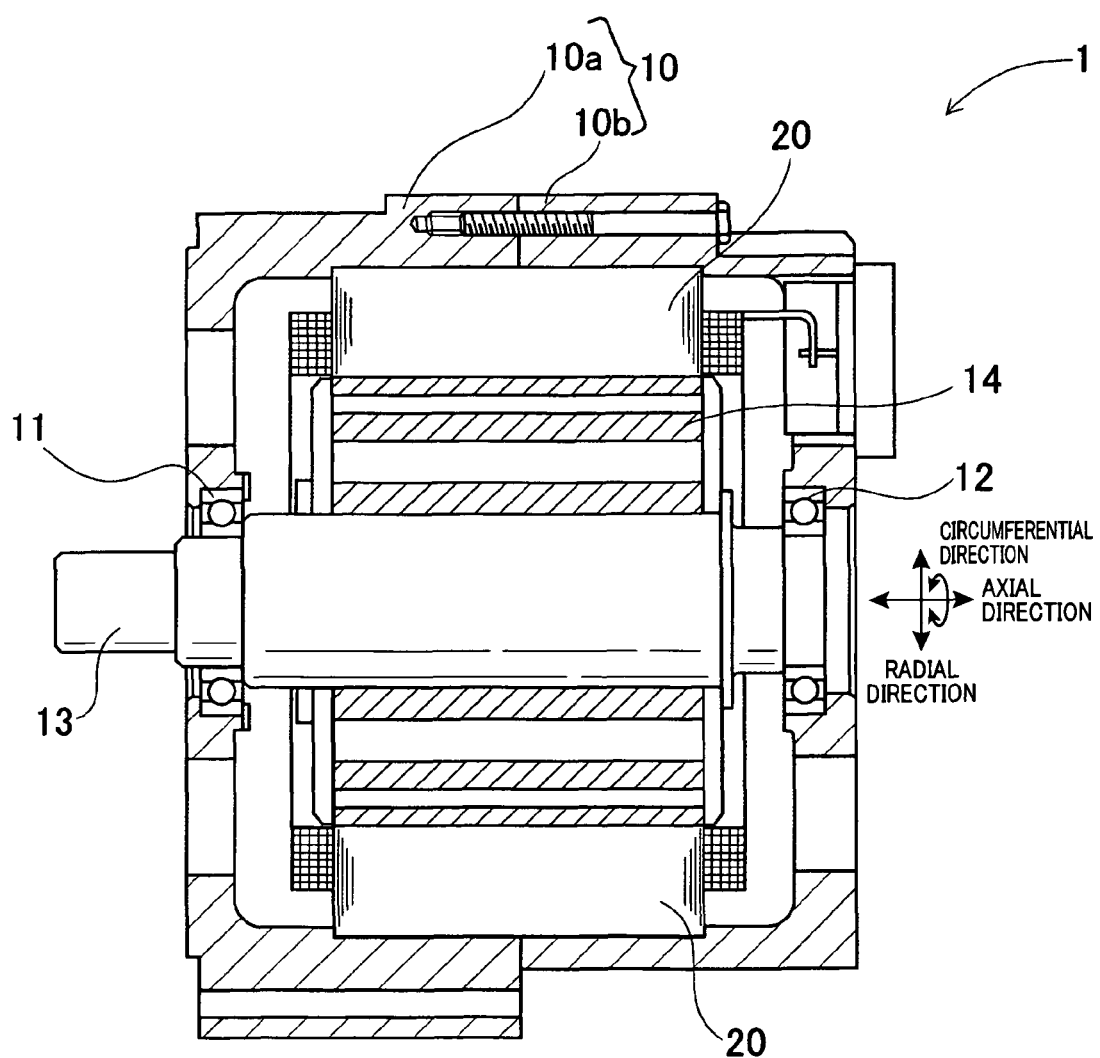
FIG. 1 is an axial-direction cross-sectional view schematically showing a configuration of a rotary electrical machine according to an embodiment.
Figure 2:
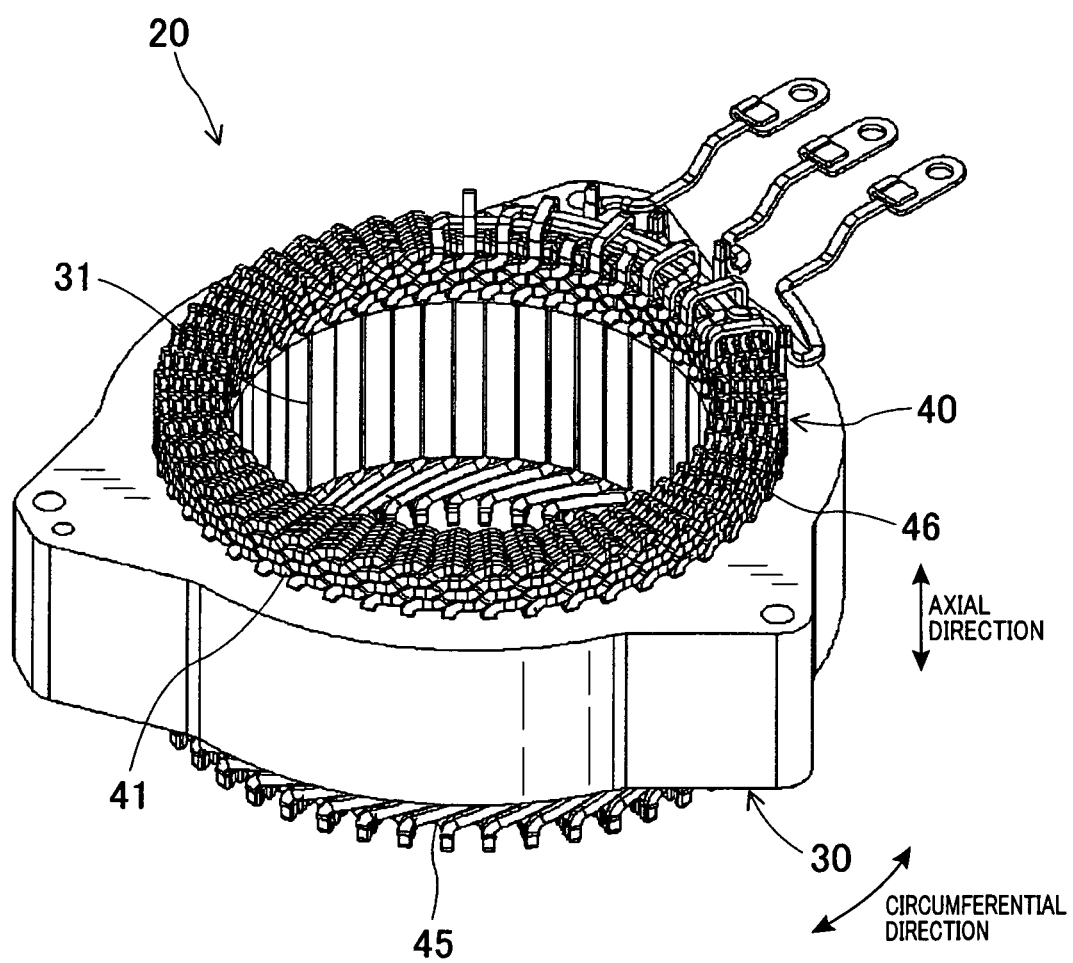
FIG. 2 is a perspective view of a stator according to the embodiment, viewed from a segment conductor insertion side.
Figure 3:
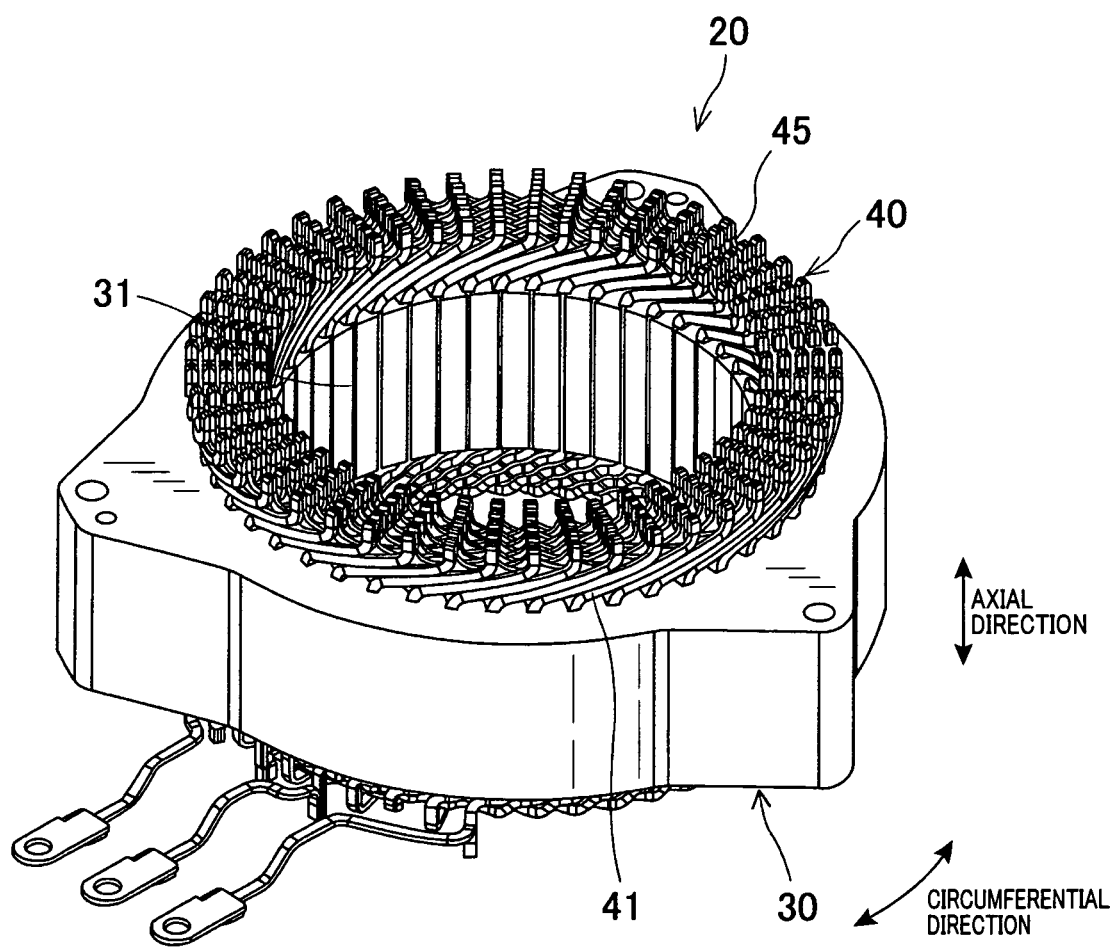
FIG. 3 is a perspective view of the stator according to the embodiment, viewed from a segment conductor welding side.

FIG. 1 is an axial-direction cross-sectional view schematically showing a configuration of a rotary electrical machine according to the embodiment. FIG. 2 is a perspective view of a stator according to the embodiment, viewed from a segment conductor insertion side. FIG. 3 is a perspective view of the stator according to the embodiment, viewed from a segment conductor welding side. FIG. 4 is a partial planar view of main sections of a stator core according to the embodiment.

A rotary electrical machine 1 according to the present embodiment includes a housing 10, a rotor 14, and a stator 20. The housing 10 is composed of a pair of bottomed, substantially cylindrical housing members 10a and 10b, of which the opening sections are bonded together. The rotor 14 is fixed to a rotary shaft 13 supported in the housing 10 by bearings 11 and 12, such as to rotate freely. The stator 20 is fixed to the housing 10 in a position surrounding the rotor 14 within the housing 10. As shown in FIG. 1, the axial direction is defined as the lengthwise direction of the rotary shaft 13, and the radial and circumferential directions are defined as shown based on the defined axial direction.

The rotor 14 forms a plurality of magnetic poles with differing magnetic polarities in an alternating manner in a circumferential direction using permanent magnets, on an outer peripheral side facing an inner peripheral side of the stator 20. The number of magnetic poles of the rotor 14 differs depending on the rotary electrical machine, and therefore, is not limited. According to the present embodiment, a rotor with twelve poles (six N poles and six S poles) is used.

As shown in FIG. 2 and FIG. 3, the stator 20 includes a ring-shaped stator core 30 and a three-phase stator winding 40. The stator core 30 has a plurality of slots 31 arranged in the circumferential direction. The stator winding 40 has a plurality of phase windings (three phase windings according to the present embodiment) and is wound around the stator core 30. Each phase winding is composed of a plurality of segment conductors 41 that are disposed such as to be inserted into the slots 31 and are connected in a predetermined state.

As shown in FIG. 4, the stator core 30 is composed of a ring-shaped back core section 32 positioned on the outer peripheral side and a plurality of teeth 33 provided projecting in an inward radial direction from the back core section 33. The plurality of teeth 33 are arranged with a predetermined amount of space therebetween in the circumferential direction. The slots 31 that are open on the inner peripheral side of the stator core 30 are formed between adjacent teeth 33, or in other words, between respective side surfaces of adjacent teeth 33 facing each other in the circumferential direction. A shoulder section that projects from the side surfaces towards both sides in the circumferential direction is formed in a tip end section of each tooth 33. The shoulder section projects from the side surface towards both circumferential direction sides. The respective side surfaces of the teeth 33 facing each other in the circumferential direction form parallel planes that are parallel with each other, excluding the shoulder sections. Therefore, the slot 31 extends in a radial direction with a constant width in the circumferential direction.

According to the present embodiment, the stator winding 40 is a double-slot distributed winding. Therefore, two slots 31 are formed per phase of the stator winding 40, for the number of magnetic poles (twelve magnetic poles) of the rotor 14. In other words, seventy-two slots 31 are formed (12×3×2=72). The same number of teeth 33 as the number of slots 31 is provided, or in other words, seventy-two teeth 34 are provided. In addition, insulating paper (not shown) is disposed such as to be inserted into each slot 31 along the peripheral wall surfaces separating the slots 31 of the stator core 30.

Figure 6:
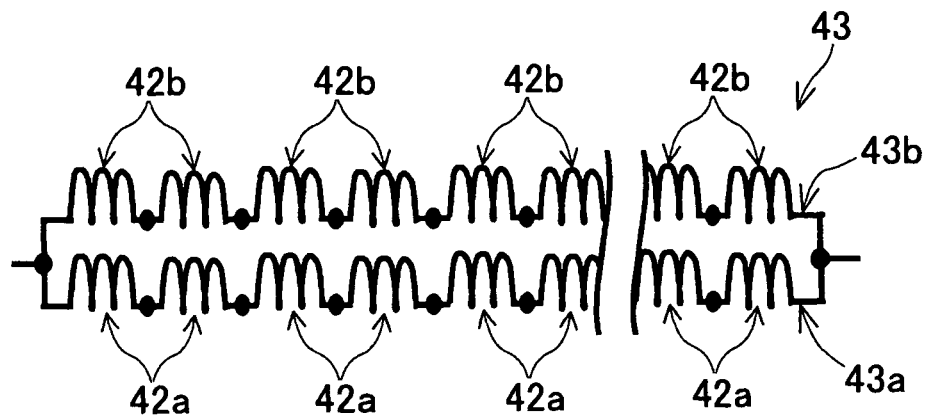
FIG. 6 is a connection diagram of segment conductors configuring each phase winding of the stator winding according to the embodiment.

The stator winding 40 is configured by three phase windings (U-phase winding, V-phase winding, and W-phase winding) 43. Each phase winding 43 is composed of the plurality of segment conductors 41 disposed such as to be inserted into the slots 31 and connected in series. According to the present embodiment, the segment conductor 41 is divided into two. As shown in FIG. 6, each phase winding 43 is configured by two divided phase windings, a first divided phase winding 43a and a second divided phase winding 43b, connected to each other in parallel. The first divided phase winding 43a and the second divided phase winding 43b are respectively configured by a plurality of segment conductors 42a and 42b being respectively connected in series such that the two divided segment conductors 42a and 42b are in parallel. The segment conductor 41 is divided such as to be cut along the extending direction of the segment conductor 41 to form two segment conductors 42a and 42b of the same shape.

The segment conductors 42a and 42b are each composed of a substantially V-shaped head section and a pair of leg sections that extend in a linear manner from both ends of the head section. The overall shape is substantially U-shaped. In the segment conductors 42a and 42b, a flat conductor is used that is composed of a conductor section having a rectangular cross-section and an insulating film covering the surface of the conductor section. The segment conductors 42a and 42b are connected such that the pair of leg sections are inserted into slots 31 separated at a predetermined slot pitch (six-slot pitch according to the present embodiment [3 phases×2 segment conductors]) from one side in the axial direction. The tip end sections of the leg sections projecting from the other side in the axial direction are then welded in a predetermined combination. The overall surfaces of the segment conductors 42a and 42b, excluding the welding areas (the tip end section of the leg sections), are covered by the insulating film. After welding, an insulating treatment using powdered resin or the like is performed on the welding areas (the tip end section of the leg sections) in which the conductor section is exposed.

Figure 5A:
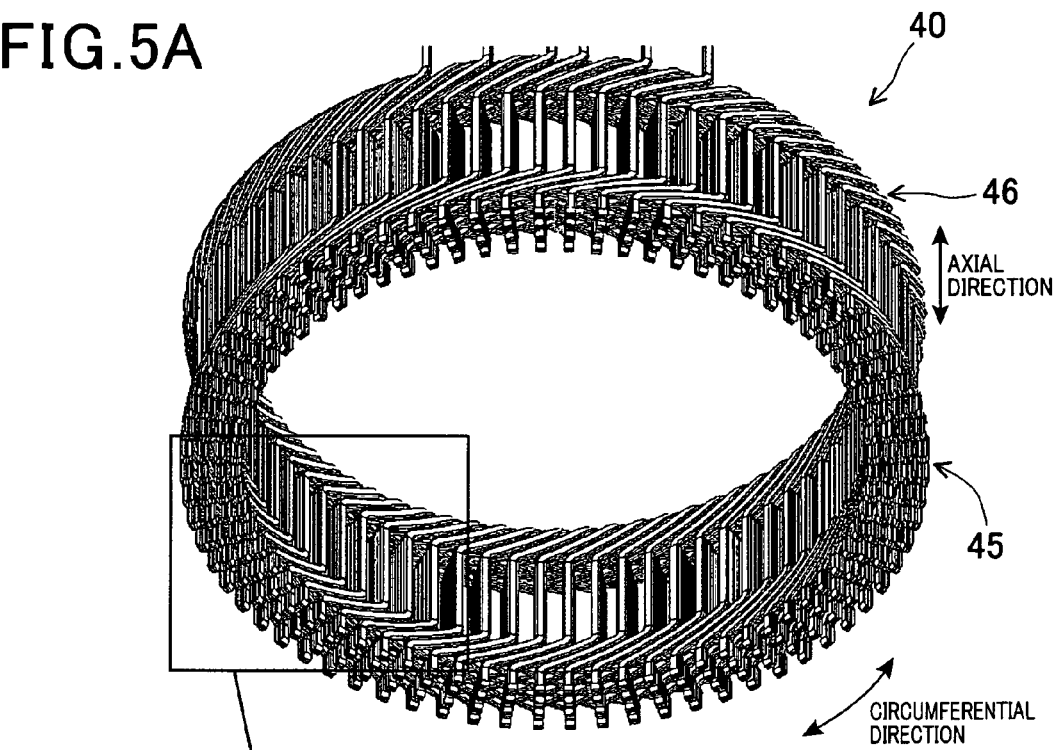
Figure 5B:
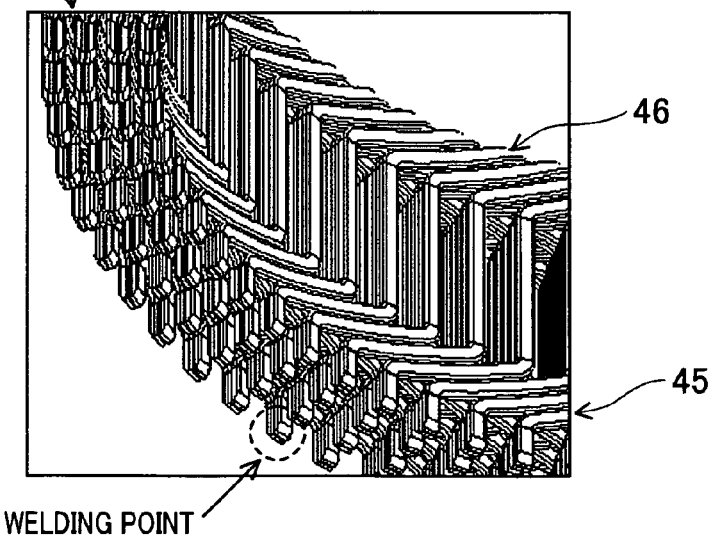

As a result of predetermined segment conductors 42a and 42b being connected in this way, the substantially cylindrical stator winding 40 such as that shown in FIG. 5 is formed. The stator winding 40 wound around the stator core 30 forms an overall ring-shaped first coil end 45 (see FIG. 3) and an overall ring-shaped second coil end 46 (see FIG. 2). The first coil end 45 is formed by the projecting end sections of the leg sections of the segment conductors 42a and 42b projecting toward one end side in the axial direction of the stator core 30.

The second coil end 46 is formed by the head section of the segment conductors 42a and 42b projecting toward the other end side in the axial direction of the stator core 30.

Figure 7:
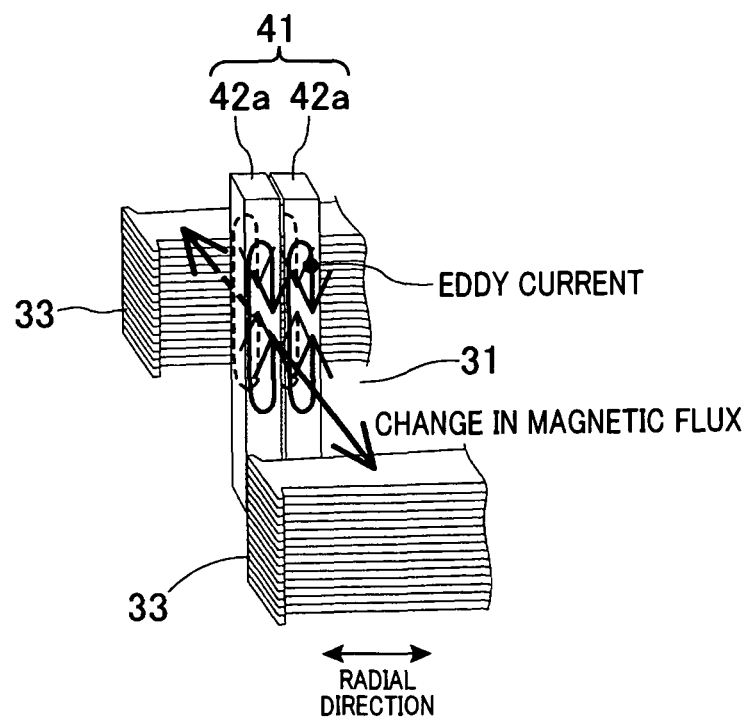
FIG. 7 is a schematic diagram of when eddy current is generated in the segment conductors in the stator winding according to the embodiment.
Figure 23A:
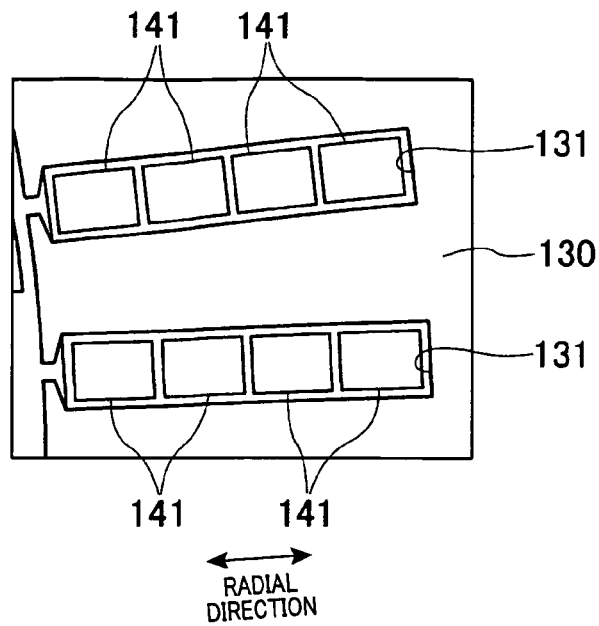
FIG. 23A is a schematic diagram of the placement state of segment conductors disposed in slots and FIG. 23B is a connection diagram of the segment conductors configuring a single phase wiring.
Figure 23B:
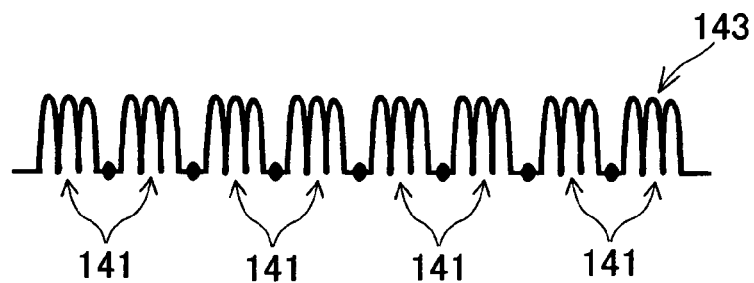
Figure 24:
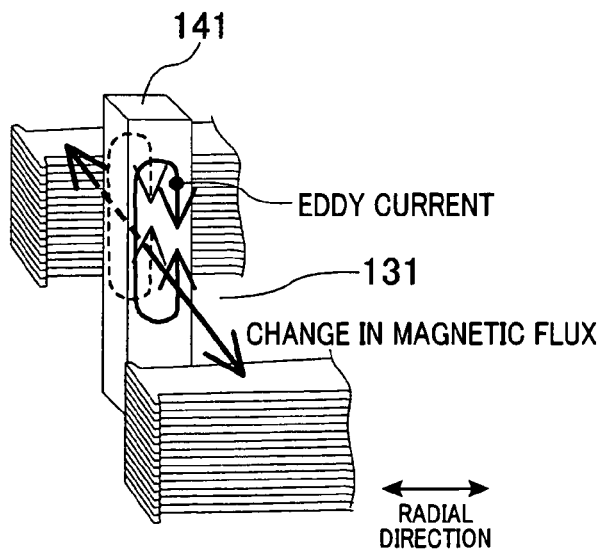
FIG. 24 is a schematic diagram of when eddy current is generated in segment conductors in the conventional stator winding.

Each phase winding 43 configuring the stator winding 40 is disposed in the slots 31 of the stator core 30 at a pitch of two slots with four turns per slot. Therefore, in each slot 31, eight leg sections of the segment conductors 42a and 42b are disposed such as to be arranged in a single row in the radial direction of the stator core 30 (see FIG. 4). As a result, the segment conductor 41 is divided such that the segment conductors 42a and 42b are stacked on one another in a direction perpendicular to the direction of leakage flux generated within the slots 31. Therefore, as shown in FIG. 7, the segment conductors 42a and 42b that have been divided into two are disposed within the slots 31 such as to be aligned in the direction (radial direction of the stator core 30) perpendicular to the direction of the leakage flux generated in the slots 31. Accordingly, the number of segments conductors 42a (42b) stacked in each slot can be made larger than the conventional described with FIGS. 23A, 23B and 24. This makes it possible to reduce a conductive area for eddy current occurring in each segment conductor 42a (42b), so that resistance for the eddy current becomes larger and an electromotive force for the eddy current becomes smaller. As a result, the eddy current generated by the leakage flux within the slots 31 can be reduced.

Figure 8:
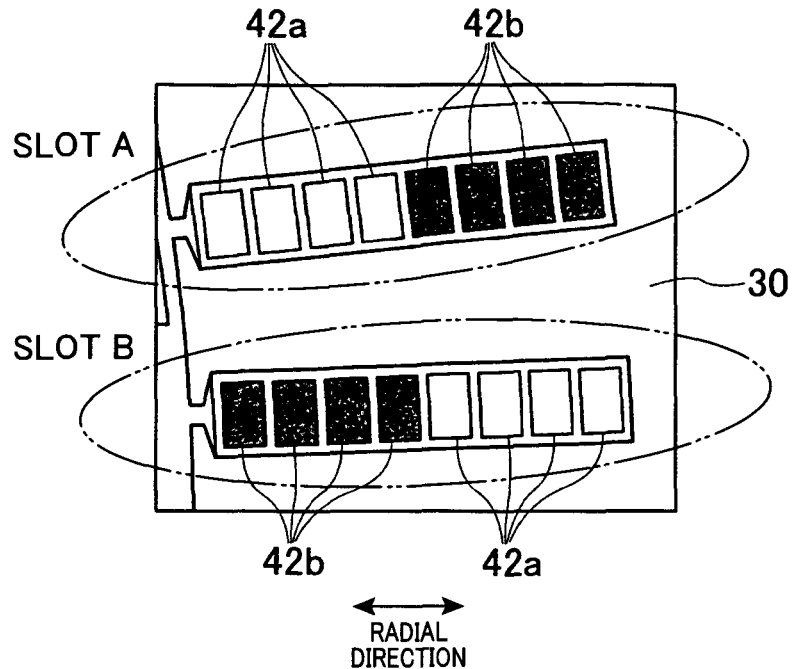
FIG. 8 is a schematic diagram of the placement positions of respective segment conductors of first and second divided phase windings disposed in two slots A and B having different voltage phases, among the slots in which the phase winding of a single phase shown in FIG. 6 is disposed.
Figure 9:
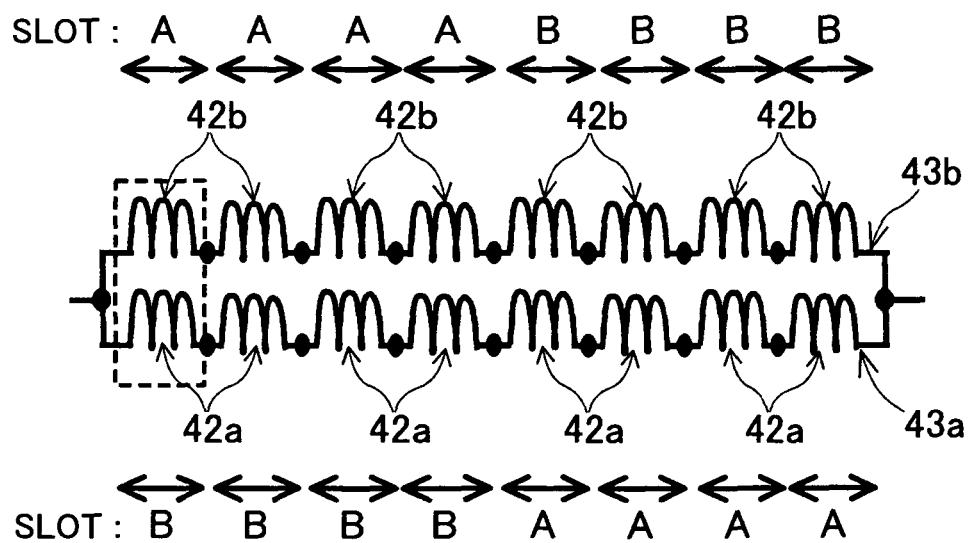
FIG. 9 is a connection diagram of the segment conductors of the first and second divided phase windings disposed in the two slots A and B shown in FIG. 8.

As shown in FIG. 8 and FIG. 9, in two slots A and B having different voltage phases among the slots 31 in which the phase winding 43 of the same phase is disposed, the respective segment conductors 42a and 42b of the two divided phase windings 43a and 43b are present in a mixed state. According to the present embodiment, in the slot A, four segment conductors 42a of the first divided phase winding 43a are disposed in first to fourth layers on the inner diameter side, and four segment conductors 42b of the second divided phase winding 43b are disposed in fifth to eighth layers on the outer diameter side. In the slot b, the four segment conductors 42a of the first divided phase winding 43a are disposed in the fifth to eighth layers on the outer diameter side, and the four segment conductors 42b of the second divided phase winding 43b are disposed in the first to fourth layers on the inner diameter side.

Therefore, the total induced voltage of the eight segment conductors 42a and 42b generated in the slot A and that generated in the slot B are the same. In other words, in the two slots A and B having different voltage phases, a difference does not occur between the total induced voltage of the eight segment conductors 42a and 42b disposed in the slot A and that of the slot B. As a result, in each phase winding 43 composed of the first divided phase winding 43a and the second divided phase winding 43b connected in parallel with each other, a short-circuit current (circulating current) is prevented from flowing.

Figure 10:
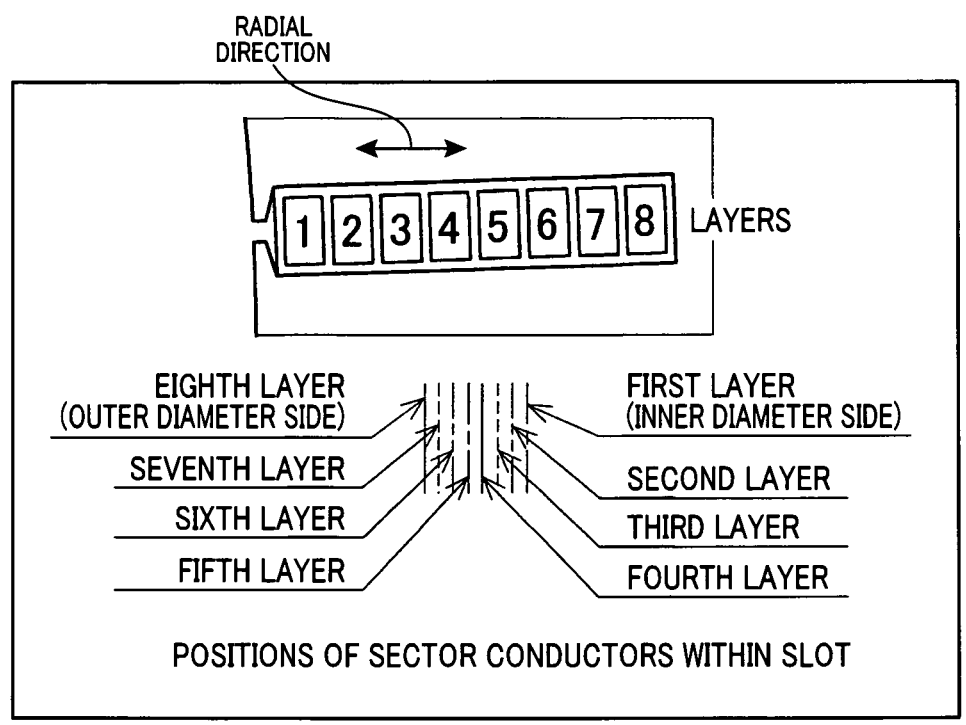
FIG. 10 is an explanatory diagram of the placement positions of segment conductors configuring the phase winding of a single phase shown in FIG. 6 within a slot.
Figure 11A:
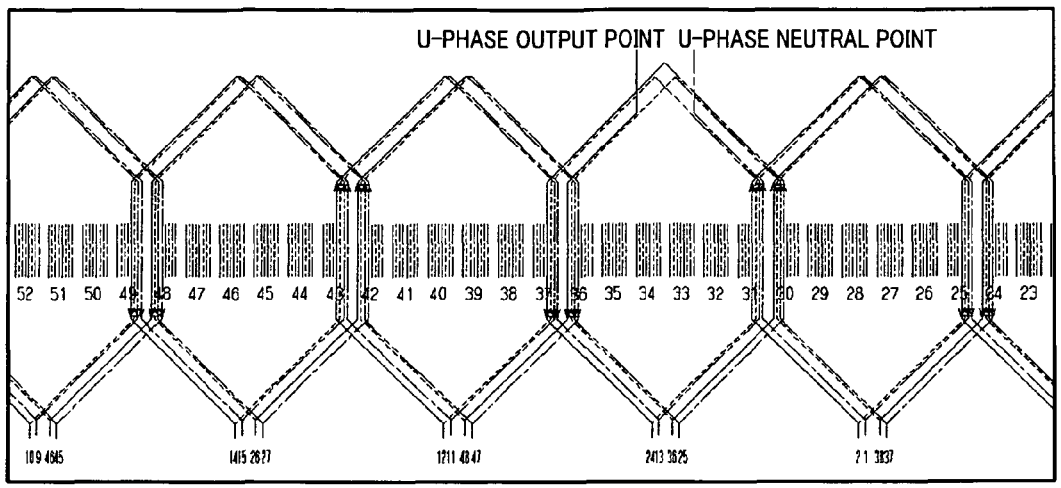
Figure 11B:
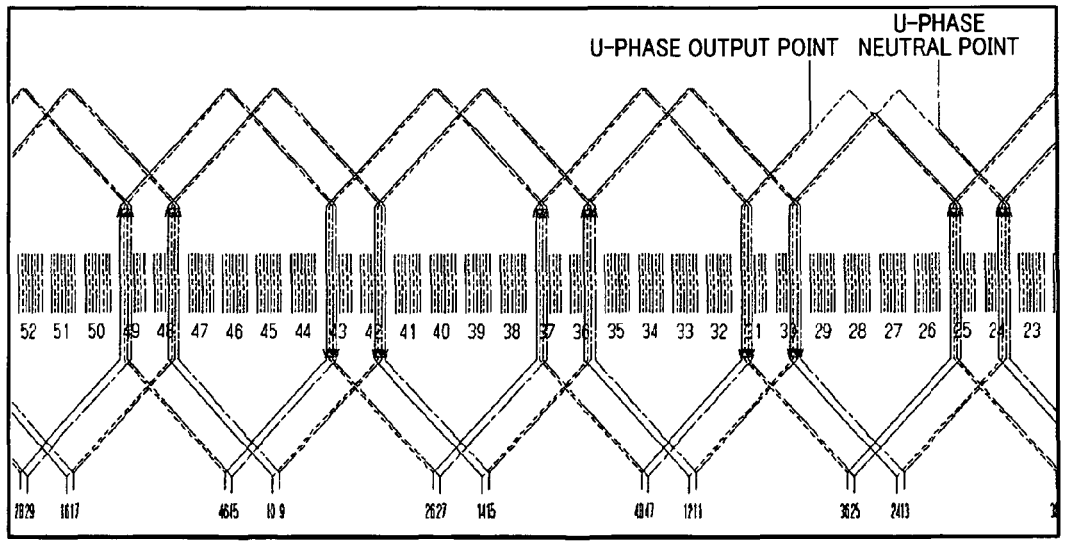

FIG. 10 is an explanatory diagram of the placement positions of the segment conductors 42a and 42b configuring the phase winding 43 of a single phase within the slot 31. FIG. 11A and FIG. 11B are winding specification diagrams showing the connection state of the U-phase phase winding 43. FIG. 11A is a winding specification diagram of the first divided phase winding 43a. FIG. 11B is a winding specification diagram of the second divided phase winding 43b. The V-phase phase winding 43 and the W-phase phase winding 43 have the same pattern as the U-phase phase winding, in a state respectively shifted to the front and to the back at an electrical angle π of 120° in relation to the U-phase phase winding 43.

According to the stator 20 for a rotary electrical machine according to the present embodiment, configured as described above, the segment conductor 41 is divided into two. Each phase winding 43 is configured by two divided phase windings, the first divided phase winding 43a and the second divided phase winding 43b, connected to each other in parallel. The first divided phase winding 43a and the second divided phase winding 43b are respectively configured by a plurality of segment conductors 42a and 42b being respectively connected in series such that the two divided segment conductors 42a and 42b are in parallel. Therefore, eddy current generated by leakage flux within the slots 31 can be reduced. AC copper loss caused by eddy current can thereby be reduced with certainty. As a result, heat generation of the segment conductors 41 can be suppressed and a motor (rotary electrical machine) can be made smaller. In addition, as a method of constructing the stator winding 40, a conventional method of constructing a stator winding that uses a segment conductor that is not divided can be used. Therefore, significant changes in the production line are not required, and significant increase in cost can be avoided.

In particular, according to the present embodiment, the segment conductor 41 is divided into two. The phase winding 43 is configured by the two divided phase windings 43a and 43b connected to each other in parallel. Therefore, balance can be favorably adjusted between the effect of reducing AC copper loss caused by eddy current, and prevention of complicated connection structures of the divided phase windings 43a and 43b (stator winding 40) accompanying the increase in the number of divisions (the number of segment conductors 42a and 42b) of the segment conductor 41. In addition, copper loss occurring when the rotary electrical machine is rotating at a high speed and copper loss occurring when the rotary electrical machine is rotating at a low speed can be reduced in a well-balanced manner.

According to the present embodiment, the segment conductor 41 is divided such that the segment conductors 42a and 42b are stacked on one another in the direction perpendicular to the direction of leakage flux generated within the slots 31. Therefore, eddy current caused by leakage flux can be reduced with further certainty.

Furthermore, according to the present embodiment, the surfaces of the segment conductors 42a and 42b have an insulating film that provides electrical insulation. Therefore, the segment conductors 42a and 42b disposed in the slot 31 are electrically insulated from each other by the insulating films. As a result, eddy current caused by leakage flux within the slot 31 can be reduced with further certainty.

According to the stator 20 according to the present embodiment, in each of a plurality of slots 31 having different voltage phases among the slots 31 in which the phase winding 43 of the same phase is disposed, the respective segment conductors 42a and 42b of the two divided phase windings 43a and 43b are present in a mixed state, such that the total induced voltage of the eight segment conductors 42a and 42b generated in each slot 31 is the same. In other words, in the slots 31 having different voltage phases, a difference is prevented from occurring in the total induced voltage of the plurality of segment conductors 42a and 42b disposed in each slot 31. As a result, a short-circuit current (circulating current) is prevented from flowing in the phase winding 43 configured by the two divided phase windings 43a and 43b connected to each other in parallel.

Figure 12:
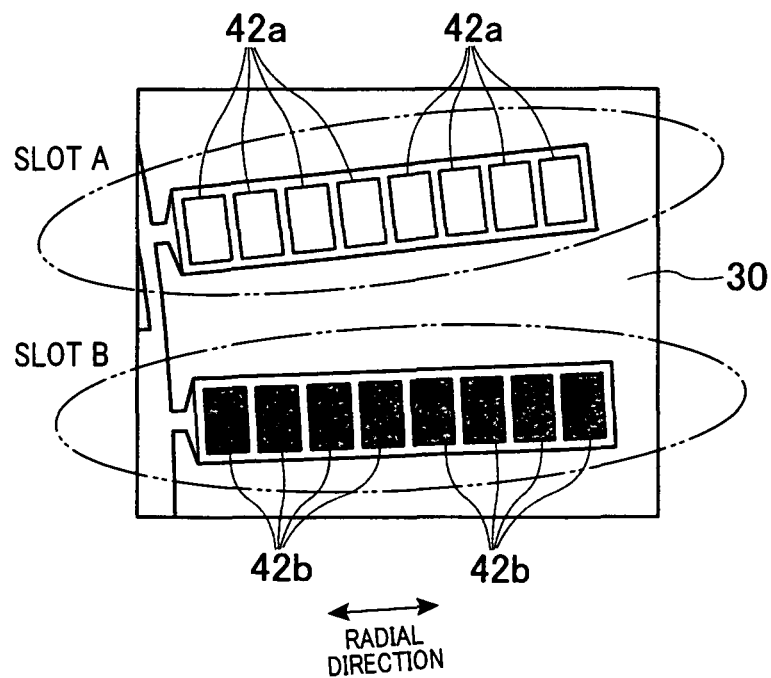
FIG. 12 is a schematic diagram of the placement positions of respective segment conductors of first and second divided phase windings disposed in two slots A and B having different voltage phases, in a comparison example 1.
Figure 13:
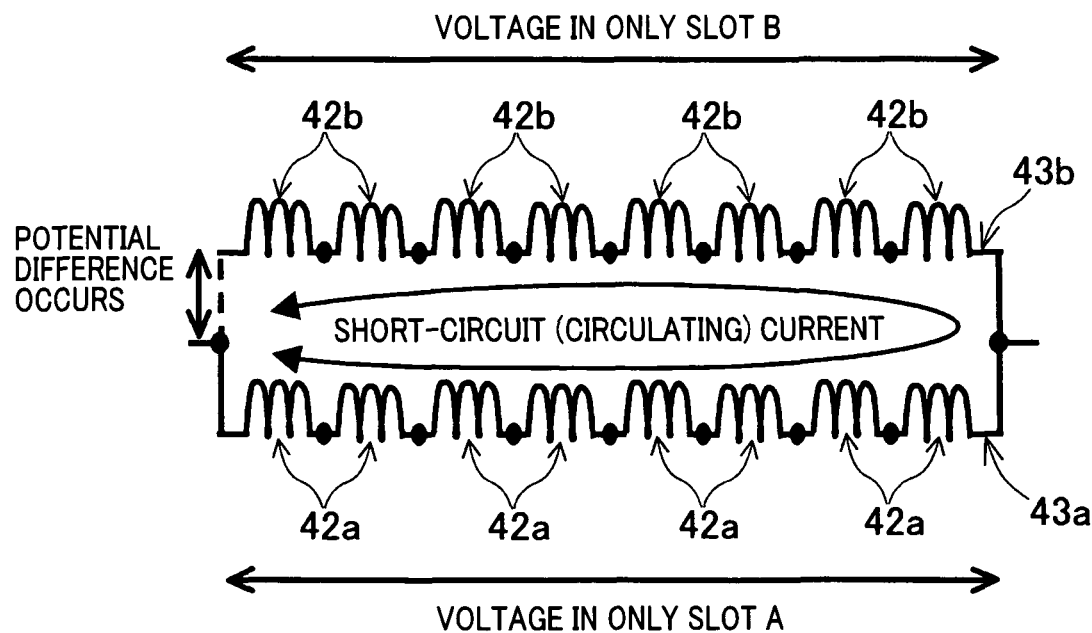
FIG. 13 is a connection diagram of the segment conductors of the first and second divided phase windings disposed in the two slots A and B shown in FIG. 12, in the comparison example 1.
Figure 14:
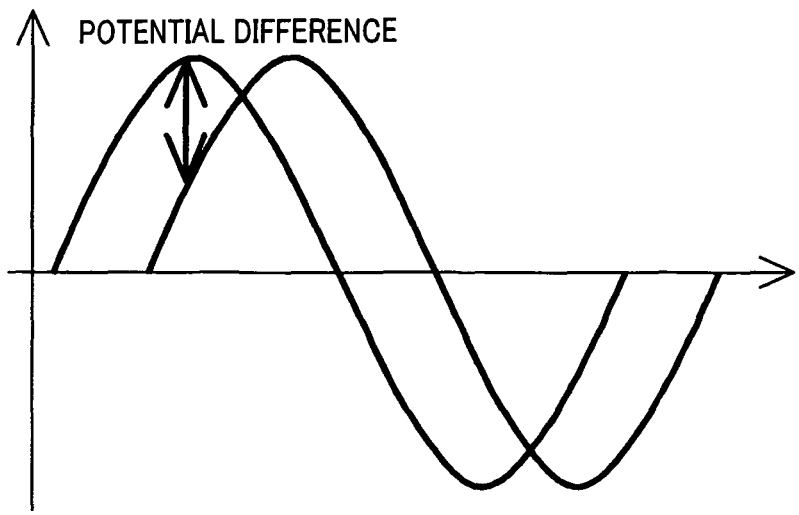
FIG. 14 is a graph showing the induced voltages of the segment conductors disposed in the two slots A and B having different voltage phases, in the comparison example 1.

Among the plurality of slots 31 provided in the stator core 30, even when the slots 31 hold the phase winding 43 of the same phase, if the voltage phase differs between the slots 31, as shown in FIG. 14, a potential difference is present in the total induced voltage of the plurality of segment conductors 42a and 42b generated in each slot 31, depending on the voltage phase (electrical angle π) between the slots 31. Therefore, as in a comparison example 1 shown in FIG. 12 and FIG. 13, when the respective segment conductors 42*a* and 42*b* of the two divided phase windings 43*a* and 43*b* are separately disposed in the two slots A and B having different voltage phases among the slots 31 in which the phase winding 43 of the same phase is disposed, a potential difference occurs between the two divided phase windings 43*a* and 43*b* connected to each other in parallel. As a result, a short-circuit current (circulating current) occurs.

(First Variation)

Figure 15:
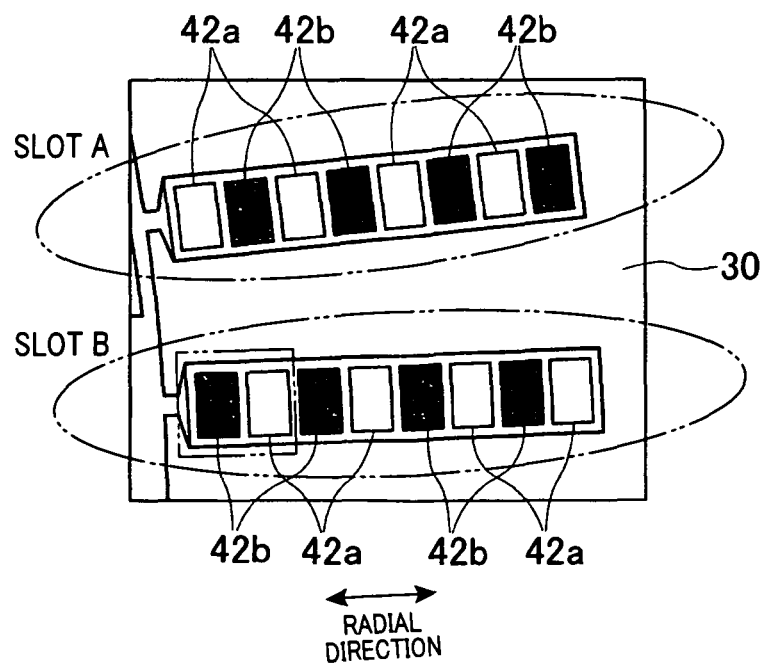
FIG. 15 is a schematic diagram of the placement positions of respective segment conductors of the first and second divided phase windings disposed in the two slots A and B having different voltage phases, in a first variation.
Figure 16:
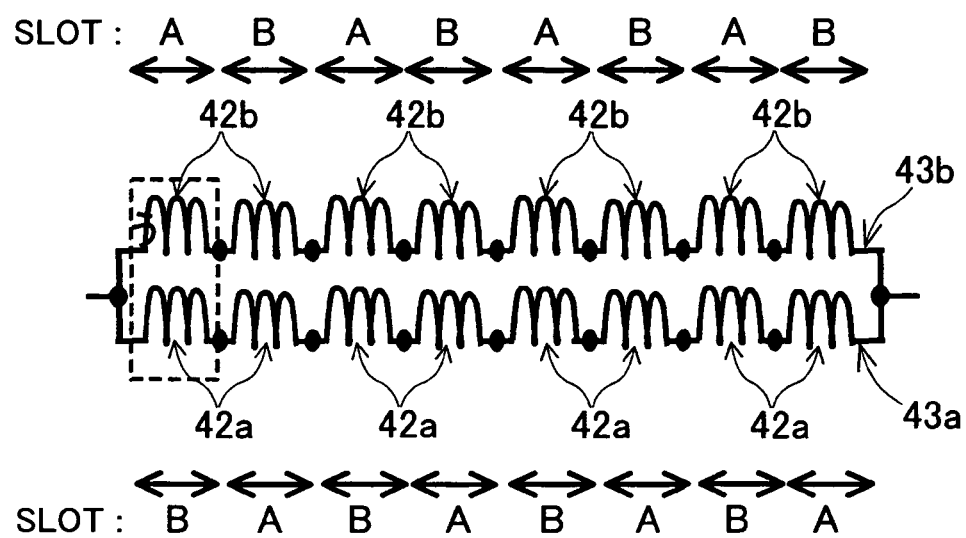
FIG. 16 is a connection diagram of the segment conductors of the first and second divided phase windings disposed in the two slots A and B shown in FIG. 15, in the first variation.

FIG. 15 is a schematic diagram of the placement positions of the respective segment conductors of the first and second divided phase windings disposed in the two slots A and B having different voltage phases in a first variation. FIG. 16 is a connection diagram of the segment conductors of the first and second divided phase windings disposed in the two slots A and B shown in FIG. 15.

According to the above-described embodiment, in the two slots A and B having different voltage phases among the slots 31 in which the phase winding 43 of the same phase is disposed, the four segment conductors 42*a* of the first divided phase winding 43*a* are disposed in the first to fourth layers on the inner diameter side in the slot A. The four segment conductors 42*b* of the second divided phase winding 43*b* are disposed in the fifth to eighth layers on the outer diameter side in the slot B. On the other hand, in the first variation, the segment conductors 42*a* of the first divided phase winding 43*a* and the segment conductors 42*b* of the second divided phase winding 43*b* are disposed as shown in FIG. 15 and FIG. 16. In other words, in each of the two slots A and B, four segment conductors 42*a* of the first divided phase winding 43*a* and four segment conductors 42*b* of the second divided phase winding 43*b* are disposed in an alternating manner. In this instance, the segment conductor 42*a* of the first divided phase winding 43*a* is disposed in the first layer of the slot A and the segment conductor 42*b* of the second divided phase winding 43*b* is disposed in the first layer of the slot B.

In the first variation as well, in which the segment conductors 42*a* of the first divided phase winding 43*a* and the segment conductors 42*b* of the second divided phase winding 43*b* are disposed as described above, the total induced voltage of the eight segment conductors 42*a* and 42*b* generated in each slot A and B can be made the same. Therefore, a short-circuit current (circulating current) can be prevented from being generated.

(Second Variation)

Figure 17A:
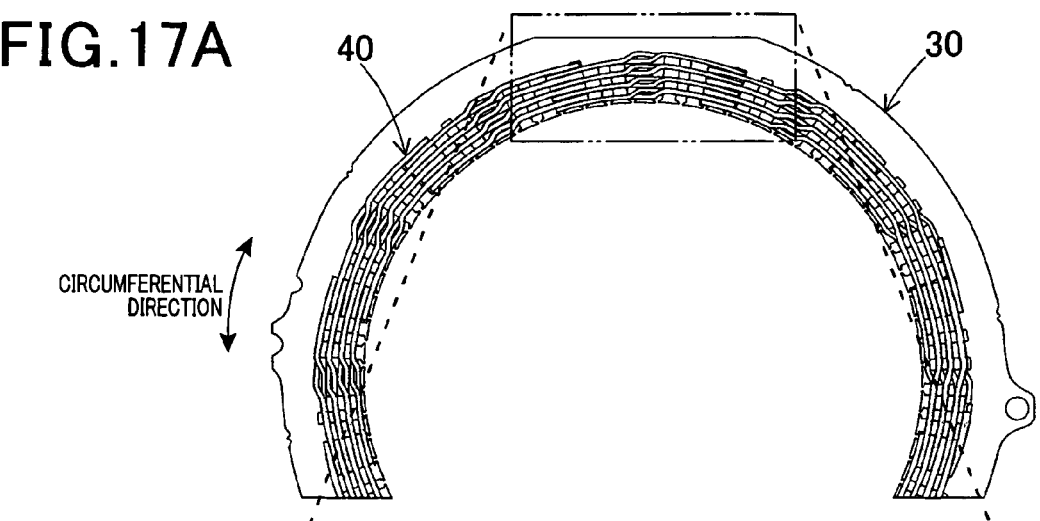
Figure 17B:
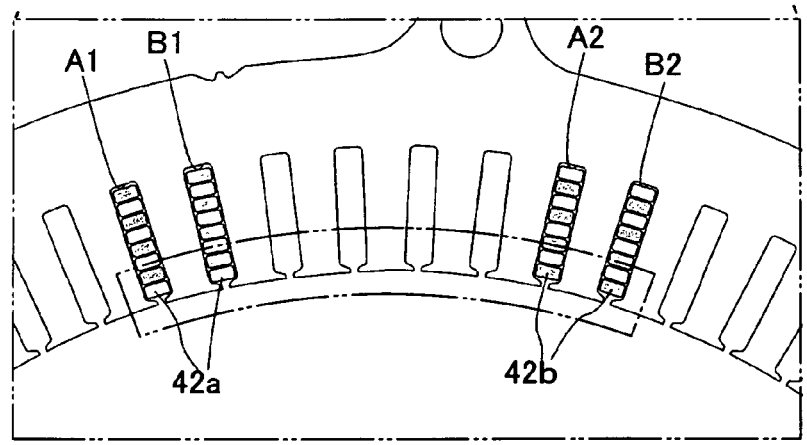
Figure 18A:
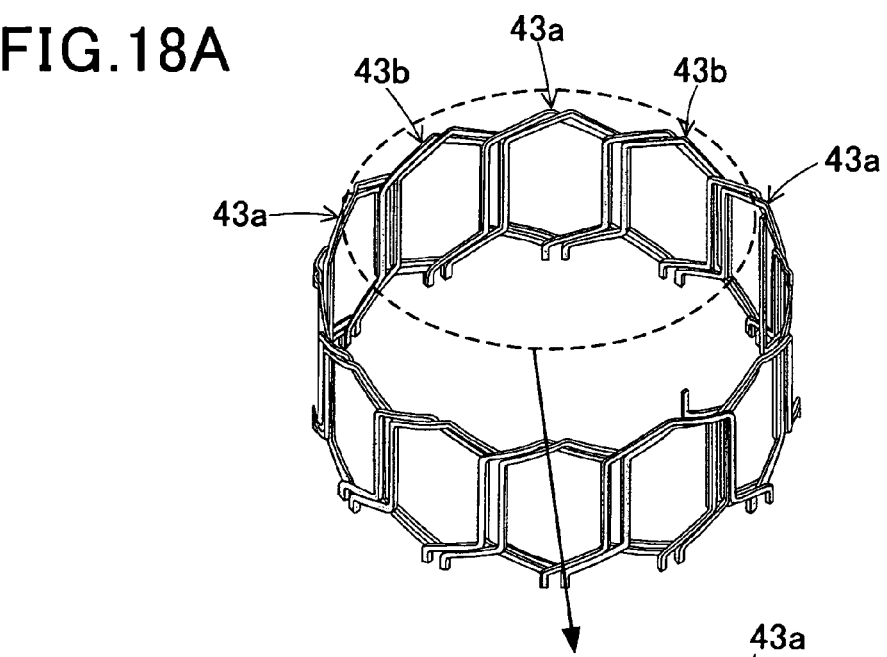
Figure 18B:
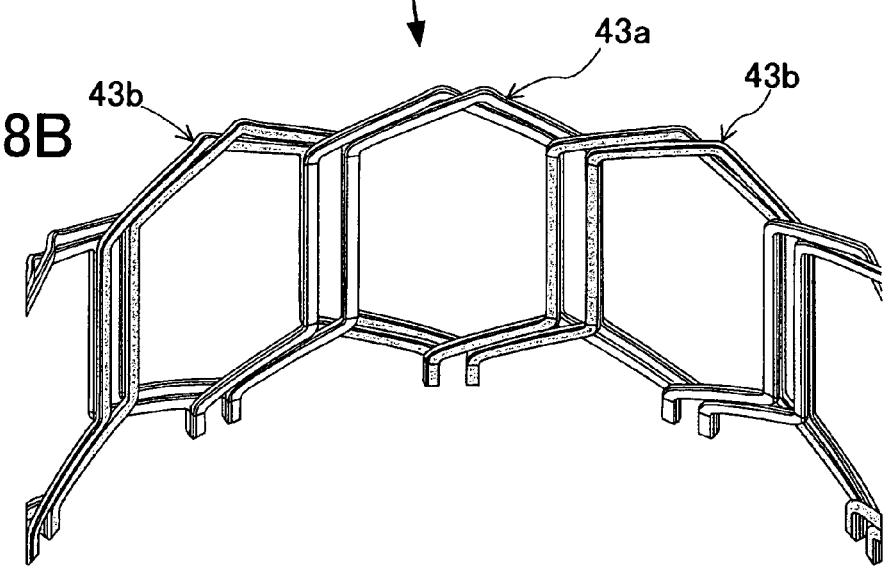

FIG. 17A is a planar view of the stator core around which the stator winding is wound. FIG. 17B is a schematic diagram of the placement positions of the respective segment conductors of the first and second divided phase windings disposed in the two slots A and B having different voltage phases. FIG. 18A is an overall perspective view of a phase winding of a single phase amounting to a single turn in which two divided phase windings are connected in parallel. FIG. 18B is a partial perspective view in which a portion of FIG. 18A is enlarged.

In the second variation, as shown in FIG. 18A and FIG. 18B, the first divided phase winding 43*a* in which two divided phase windings are connected in parallel and shifted at a slot pitch of one slot and the second divided phase winding 43*b* in which two divided phase windings are connected in parallel and shifted at a slot pitch of one slot are disposed such as to be shifted at a slot pitch of six slots. In other words, the second variation is a combination of a configuration in which two divided phase windings are connected in parallel, a wave winding, and a cross connection.

Therefore, as shown in FIG. 17B, in each of two adjacent slots A1 and B1 (i.e., a first pair of two slots), four segment conductors 42*a* of the first divided phase winding 43*a* and four segment conductors 42*b* of the second divided phase winding 43*b* are disposed in the first to eighth layers in an alternating manner. In this instance, the segment conductor 42*a* of the first divided phase winding 43*a* is disposed in the first layer of both slots A1 and B1. In addition, in each of two slots A2 and B2 (i.e., a second pair of two slots) that are separated from the slots A1 and B1 by a slot pitch of six slots (i.e., a predetermined slot pitch), four segment conductors 42*a* of the first divided phase winding 43*a* and four segment conductors 42*b* of the second divided phase winding 43*b* are disposed in the first to eighth layers in an alternating manner. In this instance, the segment conductor 42*b* of the second divided phase winding 43*b* is disposed in the first layer of both slots A2 and B2. That is, the order of alternately disposing the divided segment conductors in the radial direction is opposite to each other between the first and second pair of two slots.

In the second variation as well, in which the segment conductors 42*a* of the first divided phase winding 43*a* and the segment conductors 42*b* of the second divided phase winding 43*b* are disposed as described above, the total induced voltage of the eight segment conductors 42*a* and 42*b* generated in each slot A1, B1, A2, and B2 can be made the same. Therefore, a short-circuit current (circulating current) can be prevented from being generated.

Other Embodiments

The present invention is not limited to the above-described embodiments. Various modifications can be made without departing from the scope of the present invention.

For example, according to the above-described embodiment, the eight segment conductors 42*a* and 42*b* are inserted in the axial direction and disposed within each slot 31 such as to be aligned in a single row in the radial direction. However, the number of segment conductors 42*a* and 42*b* inserted and disposed within the slot 31 can be changed accordingly depending on the number of phases of the stator winding 40, the number of magnetic poles in the rotor 14, and the like.

In addition, the stator winding 40 according to the above-described embodiment is wound around the stator core 30 by wave winding. However, as a result of connection combinations of the tip end sections (joined sections) of the projecting end sections of the segment conductors 42*a* and 42*b* being changed, other methods of winding may be used, such as lap winding.

(FEM Analysis)

Figure 19C:
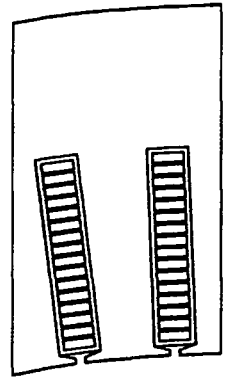
Figure 19B:
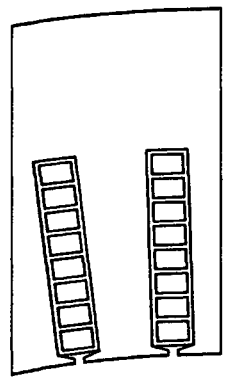
Figure 19A:
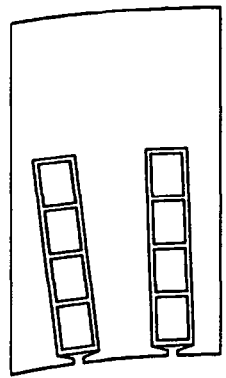

Finite element method (FEM) analysis was conducted to confirm and compare the effects of AC copper loss reduction of the present invention. In the FEM analysis, a phase winding (FIG. 19B) in which the segment conductor 41 is divided into two and two divided phase windings are connected in parallel was prepared as an example 1. A phase winding (FIG. 19C) in which the segment conductor 41 is divided into four and four divided phase windings are connected in parallel was prepared as an example 2. In addition, a phase winding (FIG. 19A) in which segment conductors 41 that are not divided are connected in series was prepared as a comparison example 1. The setting conditions in this instance was four turns per slot, and eight turns per phase. The thickness of the insulating film of the segment conductor 41 was fixed to 100 μm.

Winding space factor and phase resistance within the slot was initially examined for the examples 1 and 2, and the comparison example 1 set as described above. The results shown in FIG. 19A to FIG. 19C were obtained. In other words, from the results shown in FIG. 19A to FIG. 19C, it became clear that the winding space factor decreases and the phase resistance increases as the number of divided phase windings connected in parallel in the phase winding increases.

Figure 20:
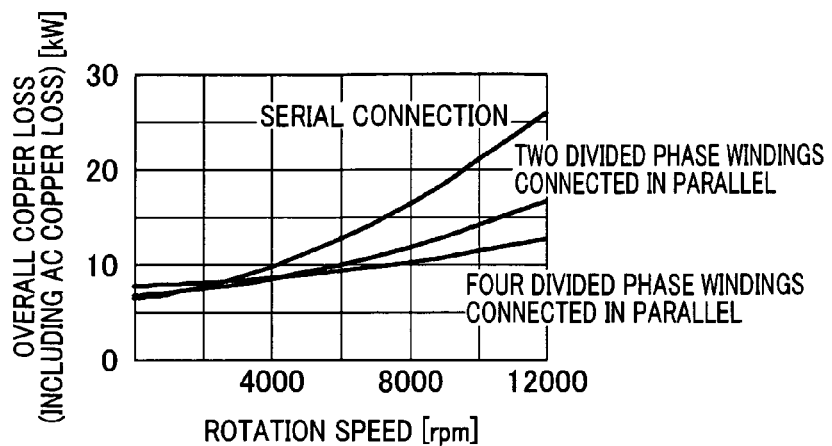
FIG. 20 is a graph showing a relationship between the rotation speed of the rotary electrical machine and overall copper loss in the FEM analysis

Next, a relationship between the rotation speed of the rotor 14 of the rotary electrical machine and overall copper loss (including AC copper loss) was examined for the examples 1 and 2, and the comparison example 1. The results shown in FIG. 20 were obtained. As shown in FIG. 20, it became clear that copper loss during high-speed rotation can be reduced and copper loss during low-speed rotation increases as the number of divided phase windings connected in parallel in the phase winding increases.

Figure 21:
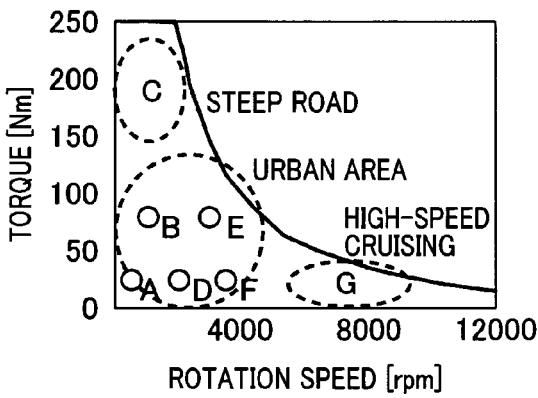
FIG. 21 is a graph showing a relationship between the rotation speed of the rotary electrical machine and torque in the operating ranges of the rotary electrical machine.
Figure 22:
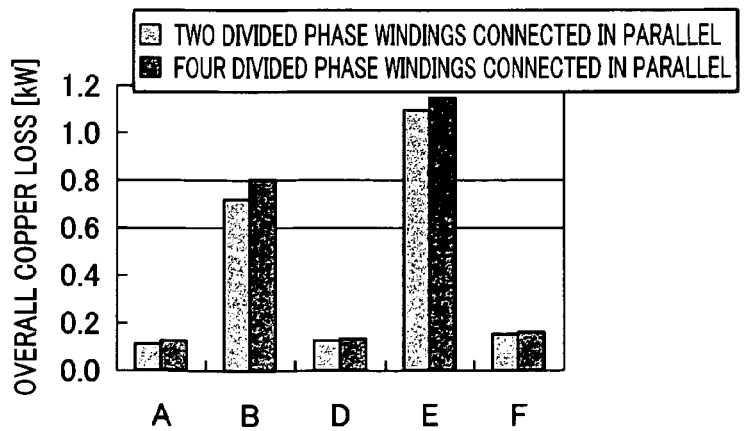

Taking into consideration the performance requirements of the rotary electrical machine, a relationship between the rotation speed of the rotary electrical machine and torque in the operating ranges of the rotary electrical machine are as shown in FIG. 21. Here, as performance requirement points, reference numbers A to G in FIG. 21 are given. When the operating ranges are classified, reference number C indicates a steep road range. Reference numbers A, B, D, E, and F indicate an urban area range. Reference number G indicates a high-speed cruising range. In this instance, importance is placed on improvement in fuel efficiency in the urban area range, based on the performance requirements. When copper loss at each requirement point of the reference numbers A, B, D, E, and F was compared between the examples 1 and 2, the results shown in FIG. 22 were obtained. As shown in FIG. 22, it became clear that, in the urban area range, the example 1 in which two divided phase windings are connected in parallel is able to operate with less copper loss.

From the above-described analysis results, it became clear that the configuration in which two divided phase windings are connected in parallel in the example 1 is optimal, taking into consideration the balance in copper loss between when the rotary electrical machine is rotating at a high speed and when the rotary electrical machine is rotating at a low speed.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A stator for a rotary electrical machine having multi-phases, comprising:

a ring-shaped stator core having a circumferential direction and plurality of slots formed to be arranged in the circumferential direction; and a stator winding having a plurality of phase windings assigned to the multi-phases respectively, each phase winding being divided into N-number of divided phase windings, N being a natural number of two or higher, each of the N-number of divided phase windings being composed of a plurality of segment conductors disposed to be inserted in corresponding ones of the slots, the plurality of segment conductors of each of the N-number of divided phase windings being electrically connected in series to each other and the plurality of segment conductors of the N-number of divided phase windings assigned to the same phase being in parallel with each other, wherein each of the segment conductors has an insulating film that provides electrical insulation on a surface thereof, and the segment conductors of the N-number of divided phase windings of the same phase winding are i) stacked in, of the slots, N-number of mutually adjacent slots which are different in voltage phase from each other and which are assigned to each of magnetic poles of a rotor opposed to the stator with a gap therebetween, and ii) disposed alternatively to be positioned every "N−1"-number of radial layers in each of the N-number of mutually-adjacent slots assigned to each of the magnetic poles of the rotor such that a total of voltages induced by the plurality of segment conductors in each of the N-number of mutually-adjacent slots becomes equal to each other.

2. The stator for a rotary electrical machine according to claim 1, wherein the number N is 2 and the number "N−1" is 1.

3. The stator for a rotary electrical machine according to claim 2, wherein the segment conductors are stacked on one another in each of the slots in a radial direction of the stator core, the radial direction being perpendicular to a direction of leakage flux generated in each of the slots.

4. The stator for a rotary electrical machine according to claim 2, wherein the segment conductors of the two divided phase windings of the same phase winding are i) stacked in, of the slots, the two mutually-adjacent slots which are different in the voltage phase from each other and which are assigned to each of the magnetic poles of the rotor and ii) disposed alternately to be positioned every one layer in each of the two mutually-adjacent slots assigned to each of the magnetic poles of the rotor.

* * * * *